(12) United States Patent
Lagnier et al.

(10) Patent No.: US 6,193,492 B1
(45) Date of Patent: *Feb. 27, 2001

(54) ELEMENT FOR MOLDING A PATTERN IN A TREAD

(75) Inventors: Alain Lagnier, Romagnat; Antoine Clarissoux; Roger Isnard, both of Clermont-Ferrand, all of (FR)

(73) Assignee: Compagnie Générale des Etablissements Michelin - Michelin & Cie, Clermont-Ferrand Cedex (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/064,561

(22) Filed: Apr. 22, 1998

(30) Foreign Application Priority Data

Apr. 24, 1997 (FR) .................................................. 97 05194

(51) Int. Cl.7 .................................................. B29D 30/68
(52) U.S. Cl. ........................... 425/28.1; 425/46; 425/438; 425/DIG. 58; 152/DIG. 3
(58) Field of Search ............................... 425/28.1, 35, 46, 425/438, 577, DIG. 58; 249/65; 264/314; 152/DIG. 3

(56) References Cited

U.S. PATENT DOCUMENTS

| | | | | |
|---|---|---|---|---|
| 2,360,528 | * | 10/1944 | Talmage | 425/DIG. 58 |
| 2,732,589 | | 1/1956 | Steadman | 264/130 |
| 2,736,924 | * | 3/1956 | Bean | 425/28.1 |
| 3,126,582 | * | 3/1964 | Scott | 425/DIG. 58 |
| 3,302,245 | * | 2/1967 | Scott | 425/DIG. 58 |
| 3,425,093 | * | 2/1969 | Ansette | 264/314 |
| 3,432,888 | | 3/1969 | Brierley | 425/28.1 |
| 3,570,585 | * | 3/1971 | Harris | 425/DIG. 58 |
| 3,608,602 | * | 9/1971 | Youngblood | 425/28.1 |
| 3,642,416 | | 2/1972 | Miller | 425/438 |
| 3,738,418 | * | 6/1973 | Harris | 425/DIG. 58 |
| 3,743,236 | * | 7/1973 | Schwenk et al. | 425/DIG. 58 |
| 4,101,256 | * | 7/1978 | White et al. | 425/DIG. 58 |
| 4,101,626 | * | 7/1978 | Takahashi et al. | 425/DIG. 58 |
| 4,130,264 | * | 12/1978 | Schroer | 425/DIG. 58 |
| 4,154,564 | * | 5/1979 | French | 425/28.1 |
| 4,266,750 | * | 5/1981 | Gallizia | 249/65 |
| 5,080,576 | * | 1/1992 | Bethurum et al. | 425/DIG. 58 |
| 5,425,627 | * | 6/1995 | Reil et al. | 249/65 |

FOREIGN PATENT DOCUMENTS

| | | |
|---|---|---|
| 1406950 | 11/1965 | (FR) . |
| 1024709 | 1/1989 | (JP) . |
| 5177697 | 7/1993 | (JP) . |
| 8025362 | 1/1996 | (JP) . |

* cited by examiner

*Primary Examiner*—James P. Mackey
(74) *Attorney, Agent, or Firm*—Baker Botts L.L.P.

(57) ABSTRACT

A molding element intended to equip a mold for molding, in a tread made of a rubber compound, a non-demoldable pattern, the element including at least one part molding a part of a pattern with an undercut. The molding element is one wherein during at least part of the demolding operation, the projected area of each part molding a pattern with an undercut onto a plane perpendicular to the demolding direction is smaller than the area of the same part projected onto the same plane in the molding position, so as to make demolding of the molding element easier.

12 Claims, 8 Drawing Sheets

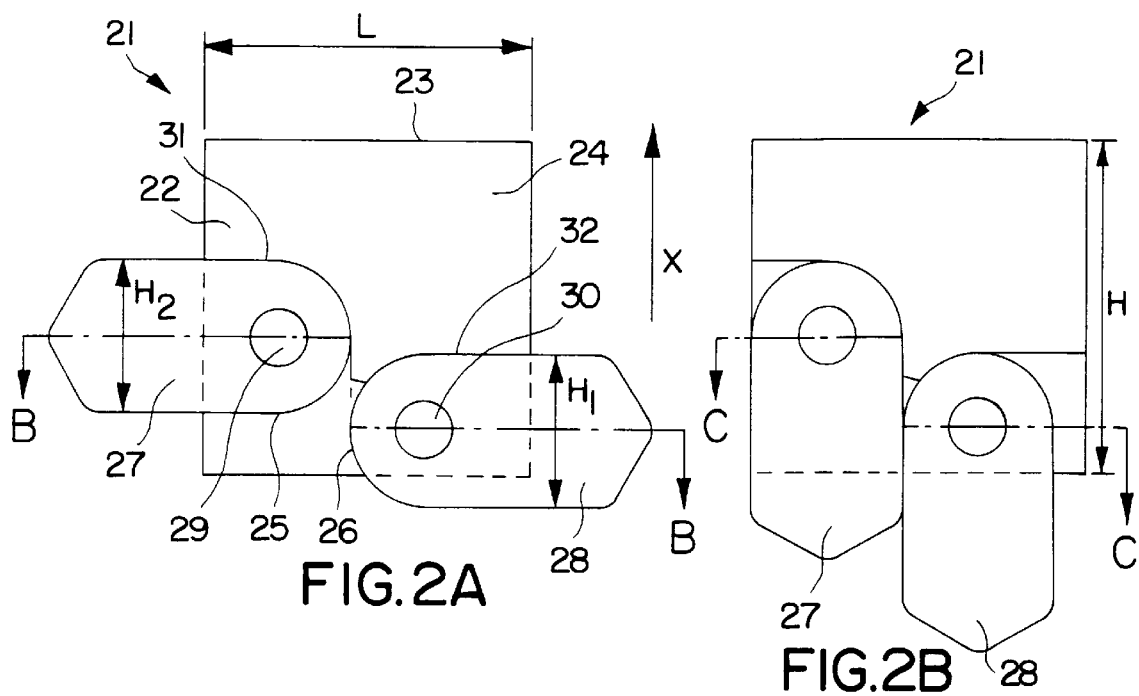
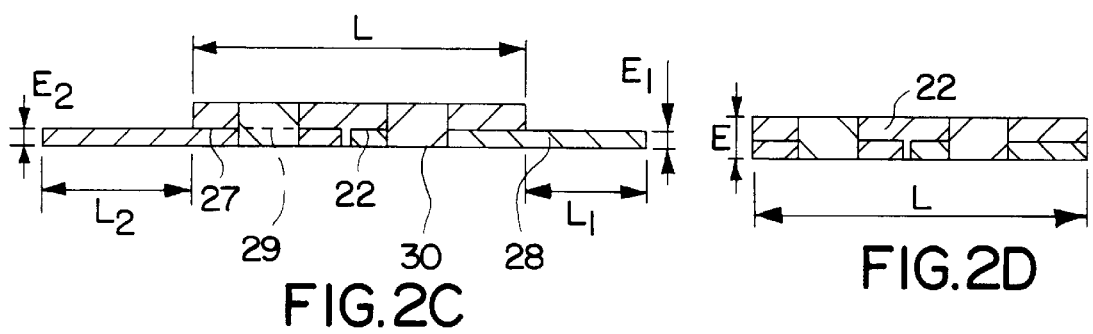
FIG.2A
FIG.2B
FIG.2C
FIG.2D

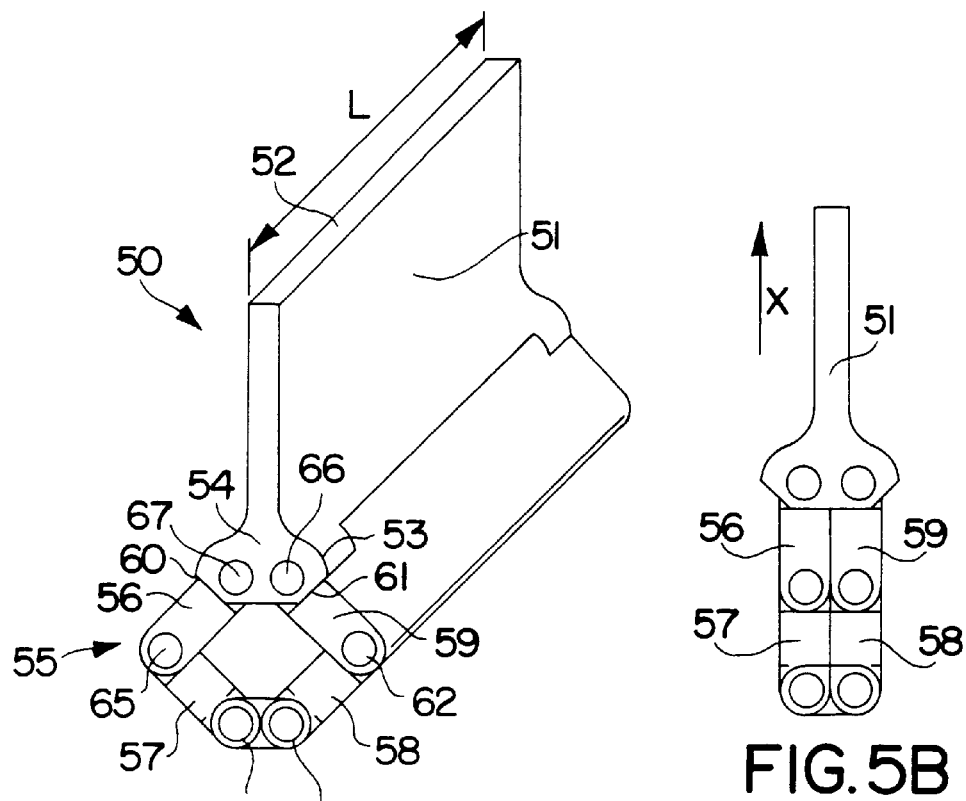
FIG.5A
FIG.5B
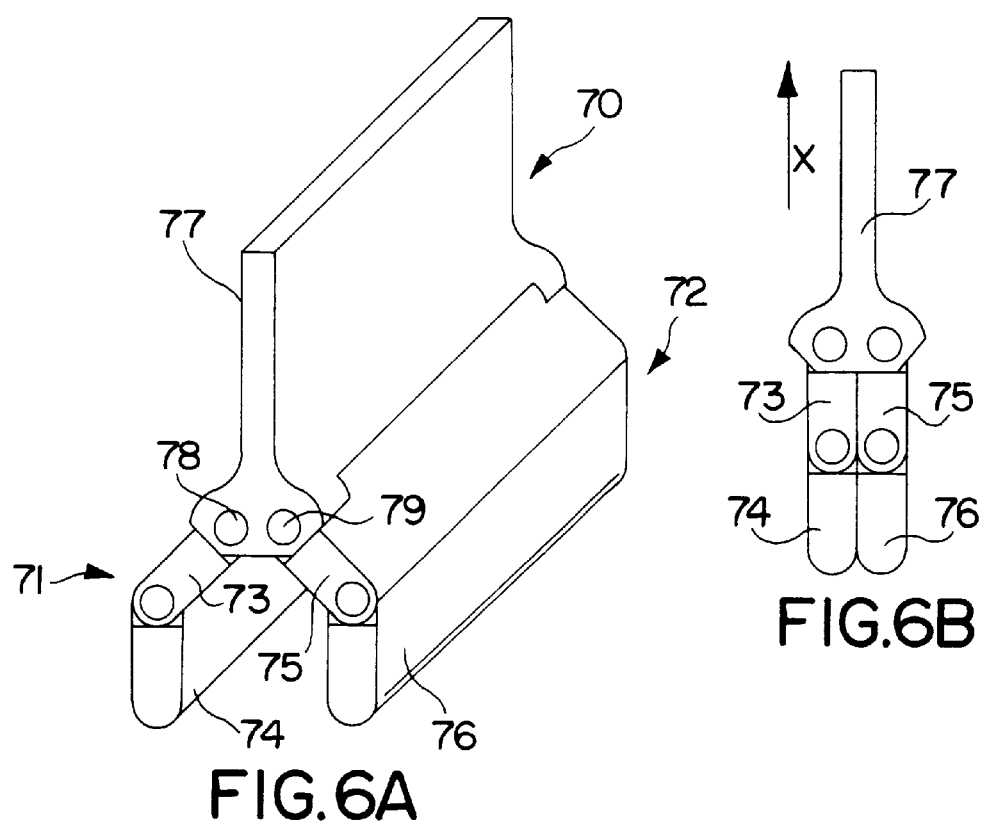
FIG.6A
FIG.6B

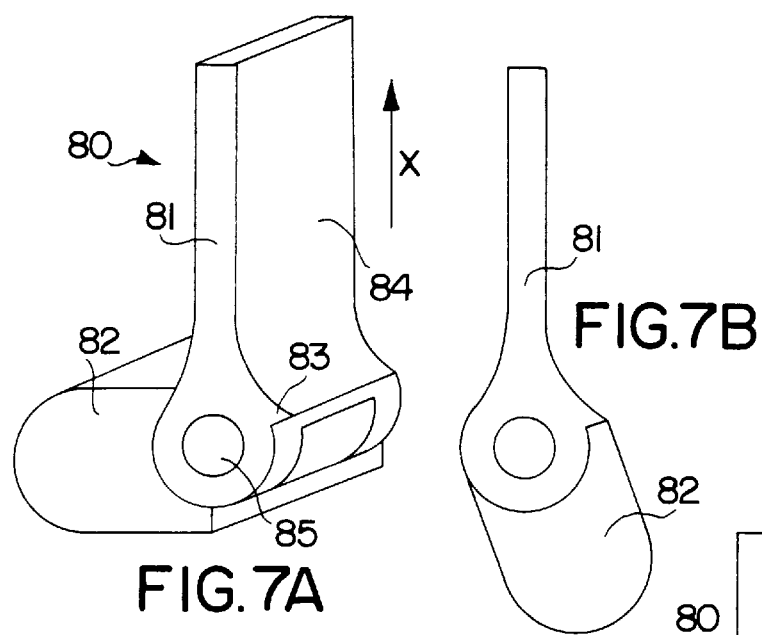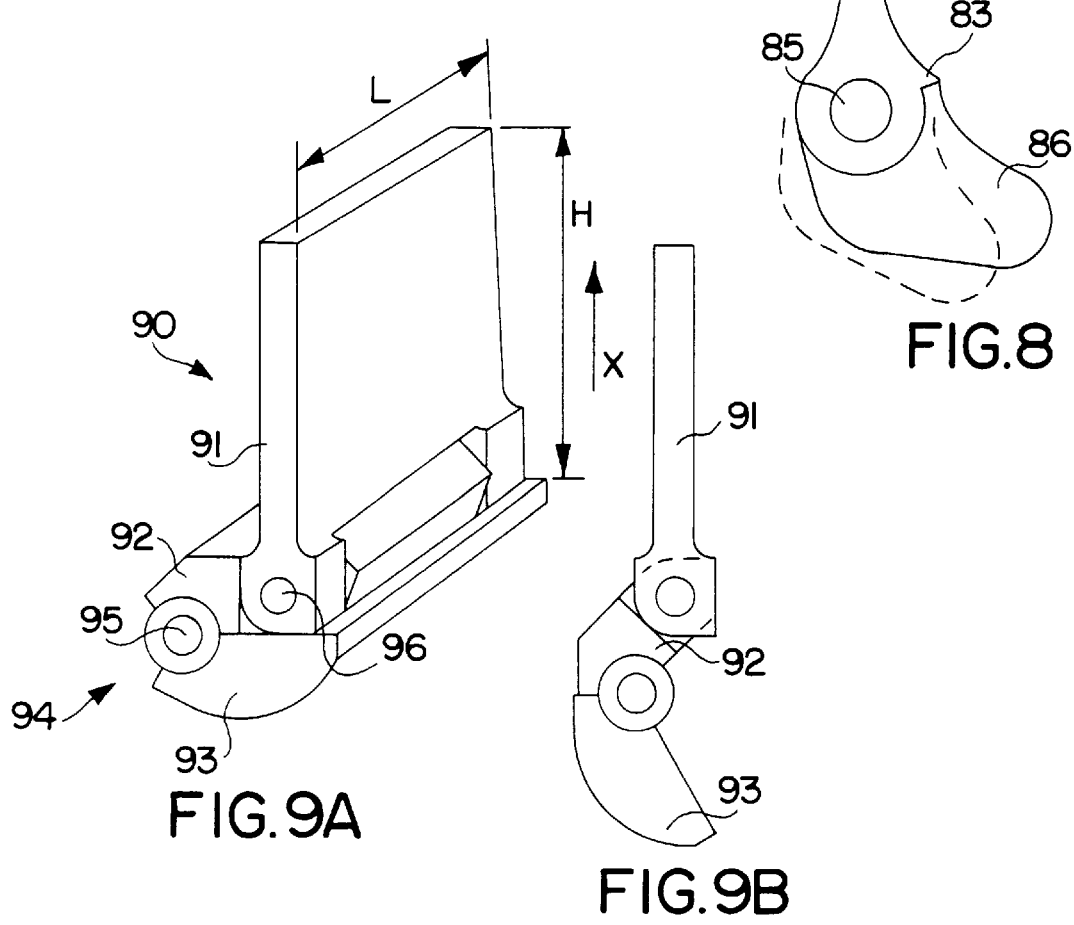

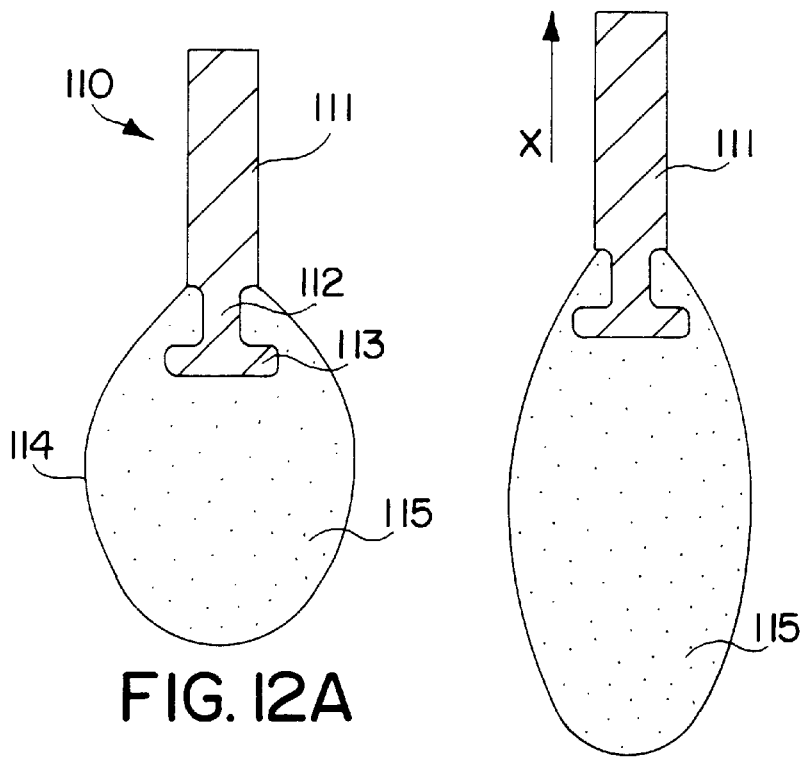
FIG. 12A
FIG. 12B
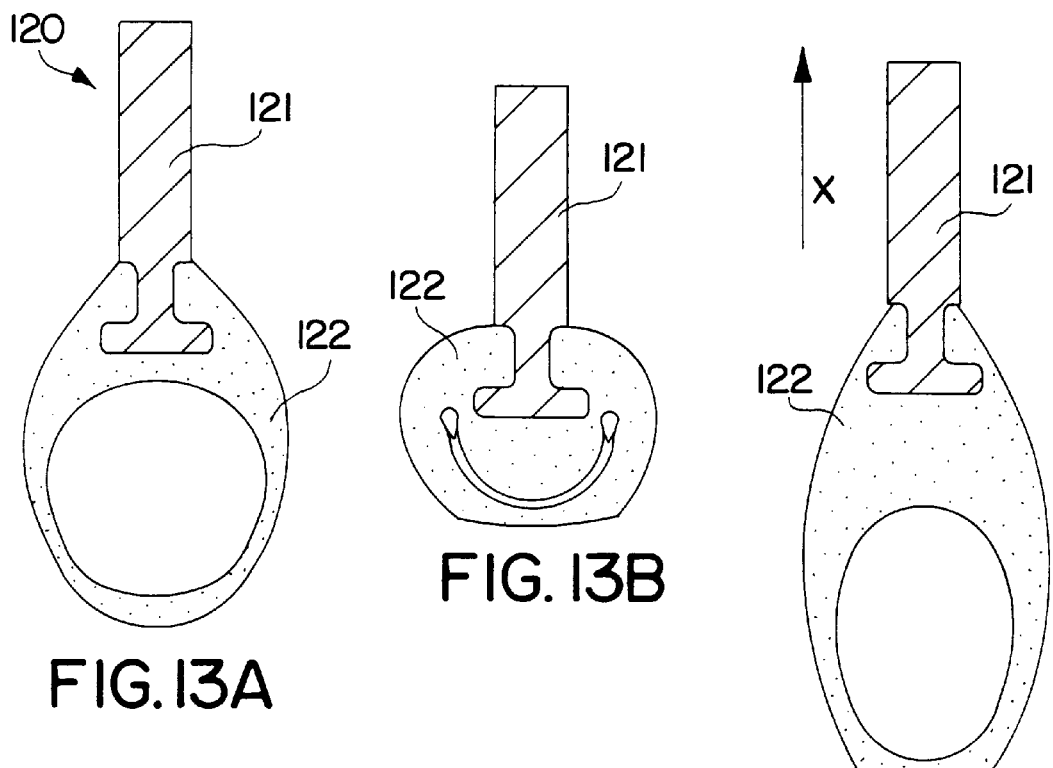
FIG. 13A
FIG. 13B
FIG. 13C

ELEMENT FOR MOLDING A PATTERN IN A TREAD

BACKGROUND OF THE INVENTION

The invention relates to molding elements intended to equip molds for molding articles or objects made of rubber and in particular treads for tires. It relates more specifically to molding elements for molding patterns of non-demoldable shape.

A non-demoldable pattern is intended to mean a pattern which has at least one undercut in its shape which means that if the molding element used for molding said pattern is trapped in rigid material, then there is no possible sliding between the element and the surrounding material because the part with the undercut opposes such sliding. The term rigid is intended to mean a material which does not allow enough elastic deformation for it to be possible for the element to be demolded, unlike the elastomeric material used, for example, to make a tire tread. In the latter case, and although the material based on a rubber compound is flexible enough to deform elastically and thus allow the demolding of the non-demoldable molding element, there may, however, be substantial deformation which, during the molding, may cause breaks in the molded material. These deformations of the molding material are all the greater if each molded pattern has at least one part with an undercut.

It has been observed that to meet an increase in performance with tires over time there is an increasing demand for tire treads which have patterns in which at least part of the tread pattern has an undercut.

It is known, for example from U.S. Pat. No. 4,794,965, that to improve the wear life of a tread with relief elements, these can be provided with a plurality of incisions which, on the running area of the tread, present straight lines, and in cross-section present broken or undulating lines over the depth.

Furthermore, and to avoid the appearance of the fatigue cracks at the bottom of the incision, it is known, see for example the patent U.S. Pat. No. 2,121,955, for the bottom of the incisions of a tire tread to be provided with a widened part forming a channel of an appropriate cross-section (which channel can also play a part in removing the water present on the area on which the tire is running). To make such an incision use is generally made of a molding element in the form of a somewhat thin metal blade which at one of its ends has a bulge intended to mold the widening of the pattern at the bottom of the incision.

With the purpose of overcoming the drop in grip during the life of a tire, U.S. Pat. No. 4,994,126, describes a tread which has incisions which, in cross-section, present lines in the shape of a fork with at least two branches, so that when said tire has been partially worn, a greater number of incisions appear. To produce such incisions, the use of rigid and non-deformable blades, generally metal, is known, the cross-sectional geometry of which is equivalent to the desired geometry of the incision. It will be readily understood that for some geometries of such blades, it is particularly difficult to extract them from the tread after molding, the branches of the block blade having to force their way out by parting the walls of that part of the incision which opens to the area of the tread.

Furthermore, when a great many non-demoldable molding elements are provided at the area of a mold, and such that they are fairly close together, it has been seen that the demolding force becomes very high; this results in an increased expenditure of energy and in an increase in the risk of material being torn out of the molded strip as a result of the demolding operation.

SUMMARY OF THE INVENTION

The object of the present invention is to propose a molding element for molding a non-demoldable pattern in a strip made of elastomeric material, said molding element not having the drawbacks of the molding elements usually employed.

In particular, there is proposed a non-demoldable molding element which, through its architecture, allows easy demolding while at the same time appreciably reducing the force needed to achieve said demolding and appreciably reducing the risk of the molded material being torn out or broken.

Among other things, the molding element according to the invention offers the possibility of producing a pattern of which the part that opens to the area of the new tire is extended under said area by a part which occupies a volume which is very much larger than the volume of the emerging part.

The structure of the non-demoldable molding element proposed in the context of the invention also makes it possible to produce patterns whose geometries are such that it could not reasonably be envisaged to produce them using conventional methods employing conventional molding elements.

The molding element in accordance with the invention is intended to equip a mold comprising a molding area for molding a tread intended in particular for a new or re-treaded tire. Another application of such a strip is also for fitting to a caterpillar track.

This molding element, once in place on the mold, projects from the molding area of said mold to mold a non-demoldable pattern, that is to say a pattern, at least part of which has an undercut and can therefore not be demolded in the demolding direction associated with said molding element. The molding element comprises at least one part for molding a part of a pattern with an undercut.

The molding element is one wherein, during at least part of the demolding operation, the projected area of each part molding a pattern with an undercut onto a plane perpendicular to the demolding direction is smaller than the area of the same part projected onto the same plane in the molding configuration.

This feature makes demolding easier with a lower force by comparison with what is needed to demold an element that would mold the same pattern but does not have said characteristic, that is to say a rigid and geometrically non-deformable element. Indeed, in the case of a rigid and non-deformable molding element, only the molded material can and should deform to allow said molding element to be extracted after molding.

During demolding, the molding element in accordance with the invention is moved in the demolding direction and is subjected to a demolding force which is opposed by the molded material surrounding said molding element bearing in mind the undercut part or parts; on each part of the molding element that forms a part of the pattern with an undercut, the forces exerted by the molded material result in a reduction in the size of the molding element through a substantial decrease in the area projected, onto a plane perpendicular to the demolding direction, of the part of the element molding a part of the pattern with an undercut. At the same time, the molded material which is elastomeric in nature and has elasticity properties, deforms enough to allow those parts of the pattern that open to the area of the tread to open and thus allow the molding element to be extracted from said material.

DESCRIPTION OF THE DRAWINGS

The invention which has just been explained will be better understood with the aid of the following figures which deal with a number of embodiments which are presented merely by way of examples:

FIG. 2A is a view of another molding element according to the invention shown in one position;

FIG. 2B is a view of the molding element shown in FIG. 2A in another position;

FIG. 2C is a section taken along the line B—B of FIG. 2A;

FIG. 2D is a section taken along the line C—C of FIG. 2C;

FIG. 5A shows a molding element composed of several parts articulated together to mold an incision extended by a channel;

FIG. 5B shows the molding element of FIG. 5A in a different position;

FIG. 6A shows another alternative form of molding element formed as an articulated assembly of several rigid parts for molding a Y-shaped incision;

FIG. 6B shows the molding element of FIG. 6A in different position;

FIG. 7A shows a molding element formed of two parts articulated together;

FIG. 7B shows the molding element of FIG. 7A in a different position;

FIG. 8 shows another alternative form of molding element which may have two distinct molding configurations;

FIG. 9A shows a molding element formed in three rigid parts articulated together;

FIG. 9B shows the molding element of FIG. 9A in a different position;

FIG. 12A is a view of a molding element comprising a part forming bead of elastically deformable material, said element molding an incision which is extended by an undercut channel;

FIG. 12B shows the molding element of FIG. 12A in demolding condition.

FIG. 13A shows a molding element comprising a part forming an elastically deformable tube for molding a pattern with an undercut;

FIGS. 13B and 13C show the molding element of FIG. 13A in different conditions;

DESCRIPTION OF THE PREFERRED EMBODIMENTS

Figure 1A:
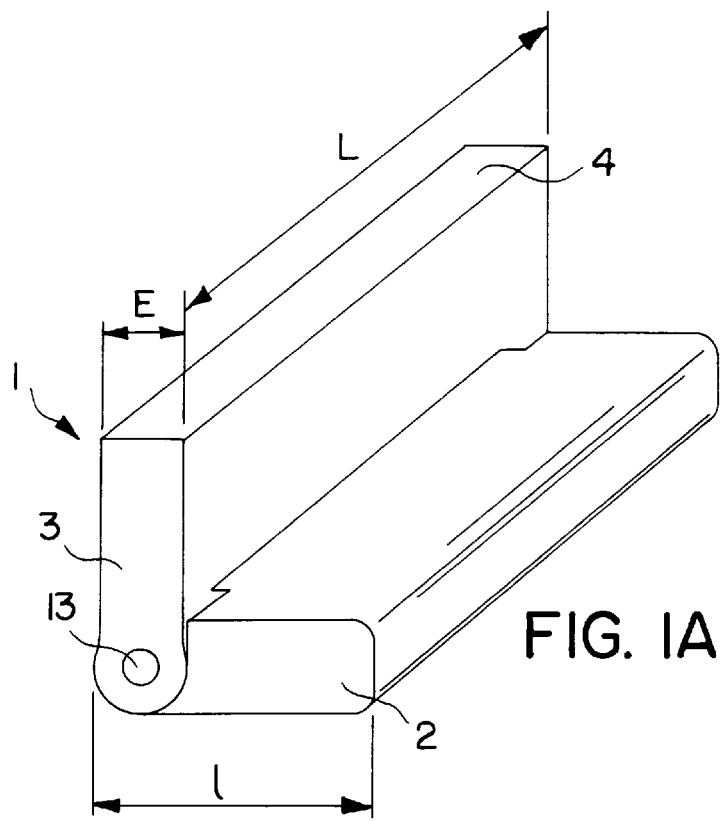
FIG. 1A is perspective view of a molding element according to the invention shown in one position.
Figure 1B:
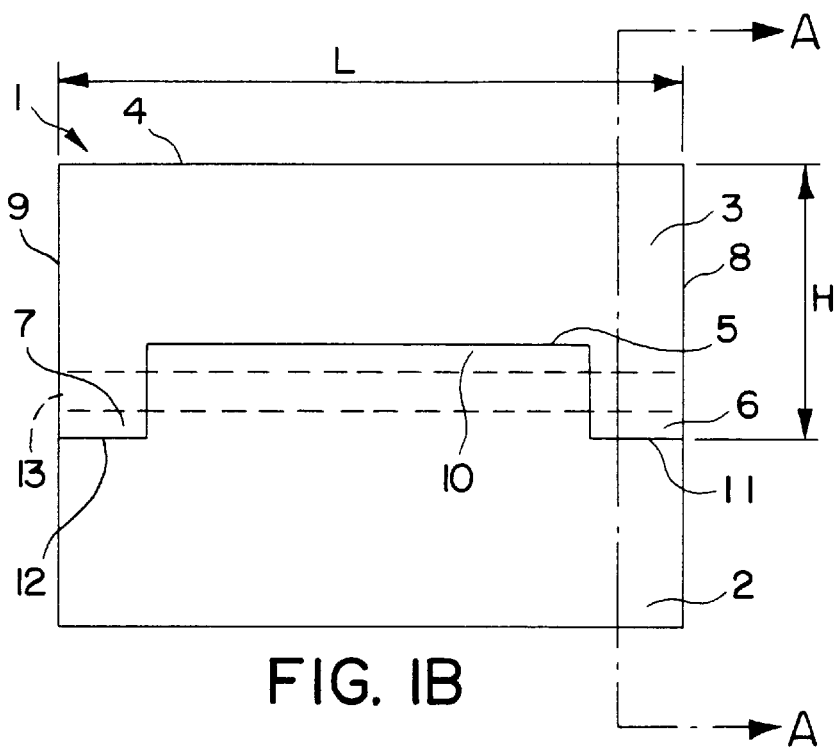
FIG. 1B is an elevational view of the molding element shown in FIG. 1A in a different position.

The molding element I depicted in FIG. 1 is produced by combining two metal parts 2, 3 of flat geometry with the same thickness E and the same length L; each of said parts is rigid enough that it does not deform under the action of the forces exerted by the rubbery substance during molding. The part 3, of more or less rectangular shape and of width H is intended to be fixed by its upper edge 4 to the molding area of a mold, not depicted here, while its lower edge 5 is produced in such a way as to have two lugs 6 and 7 near the lateral edges 8 and 9 of said part 3. To complement this, the part 2 comprises an upper edge 10 which has a geometry design to be able to be connected to the lower edge 5 of the part 3; two cutouts 11 and 12 are provided on said upper edge 10 of the part 2 and the lugs 6 and 7 of the part 3 fit into them. The part 2 and the part 3 are joined together by passing a pivot pin 13, the length of which is more or less equal to the length L of the parts 2 and 3 through the two lugs 6 and 7 and that region of the part 2 which lies between said two lugs. This assembly constitutes a hinge allowing the part 2 to turn so as to alter its orientation with respect to the part 3 of the molding element, as is shown in FIGS. 1A and 1B which respectively depict the molding element 1 in its molding configuration (FIG. 1A) and during demolding (FIG. 1B).

Figure 1C:
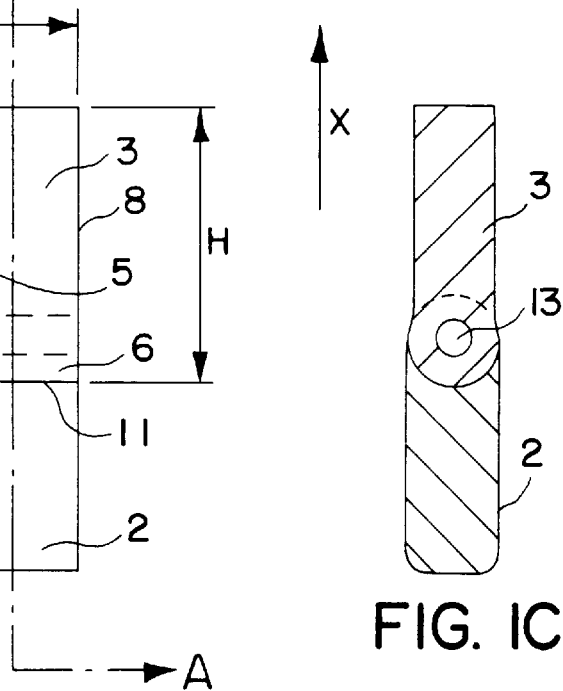
FIG. 1C is a cross sectional view of the molding element taken along the line A—A of FIG. 1B.

The arrow X, perpendicular to the direction of the pin 13 and parallel to one of the faces of the part 3, represents the demolding direction of the molding element 1. FIG. 1C depicts a section on A—A taken through the molding element in the demolding position of FIG. 1B.

The part 2 molding the part of the pattern with the undercut when in the molding position (FIG. 1A) makes an angle of 90° with the part 3 so as to mold a part of a pattern with an undercut which in cross-section has a width 1 which is very much greater than the thickness E of the molding element 1. The projected area of the part 2 molding the part of the pattern with an undercut on a plane perpendicular to the demolding direction X is in this case equal to the product L×1.

During demolding (FIG. 1B), the part 2 is subjected to the forces of reaction of the rubber compound surrounding said part 2 and opposing said demolding; during demolding, the rubbery material deforms and at the same time the part 2, subject to the action of the forces of the part of the pattern with an undercut rotates about the pin 13 so that in projection onto a plane perpendicular to the demolding direction X it presents an area smaller than the area L×1; in this particular instance, the final area is equal to L×E.

Beside the main advantage, which relates to the ease of demolding as a result of the structure described, the molding element according to the invention offers the advantage of allowing the part 2 or the part 3 to be replaced to obtain a partial modification in the geometry of the pattern molded by said molding element.

To temporarily fix the geometry of the molding element, there may be a minimum desired friction for each articulation, so as to allow rotation only above and beyond a predetermined force threshold.

Depicted in FIG. 2 is an alternative form of a molding element according to the invention, comprising two parts which can move in rotation about pivot pins which are perpendicular to a third part, the latter part being intended to be fixed to a mold.

The molding element 21 consists of a first part formed by a flat and rigid part 22 made of metal; this part is in the form of a rectangle of length L and width H (corresponding to the depth of the pattern molded by said molding element) and of thickness E. The molding element is intended to be fixed by its upper edge 23, and using appropriate means, to the molding area of part of a mold molding a tread made of rubber compound. The arrow X represents the direction and sense of demolding of the molding element 21; this direction is parallel to the front face 24 of said element and is perpendicular to the upper edge 23.

The molding element 21 additionally comprises two parts 27, 28, each molding an undercut part of the same tread pattern.

Two recesses have been made on the face 24 and in part of the thickness of the part 22, to act partially as housings 25 and 26 for the two metal parts 27 and 28 of elongate shape, each part 27, 28 having the shape of a rigid thin plate of thickness E1 and E2 and length L1 and L2, respectively. These parts 27 and 28 are mounted in the housings 25 and 26 in such a way that they are free to rotate about two pivot pins 29 and 30 respectively, said pins being perpendicular to the face 24 of the part 22. In addition, the mounting pins for the parts 27 and 28 are offset in a direction parallel to the direction X.

In the molding position, the parts 27 and 28 butt against the upper walls 31 and 32 of the housings 25 and 26 so that a pattern which has two undercut parts can be molded, as can be seen in FIG. 3C depicting a section on B—B of the molding element 21 shown in FIG. 2A. L1 and L2 represent the lengths of the undercuts formed by the parts 28 and 27, respectively.

The orientations of the walls 31 and 32 of the housings 25 and 26 with respect to the direction X fix the angles of the parts 27 and 28 in the molding position.

In this molding configuration, the sum of all the hatched areas seen in FIG. 2C is equal to the area of the molding element projected onto a plane perpendicular to the demolding direction X.

During demolding, the parts 27 and 28, subject to the forces of reaction of the rubbery material, rotate about the pins 29 and 30 so as to present an area projected onto a plane perpendicular to the demolding direction X which is smaller to allow easier demolding (FIG. 2B).

This rotation is gradual and is made possible only by the elastic deformation of the molded material. FIG. 2D shows a section on C—C of the molding element 21 in the final demolding position shown in FIG. 2C; the sum of the hatched areas represents the reduced projected area of the molding element.

Figure 3:
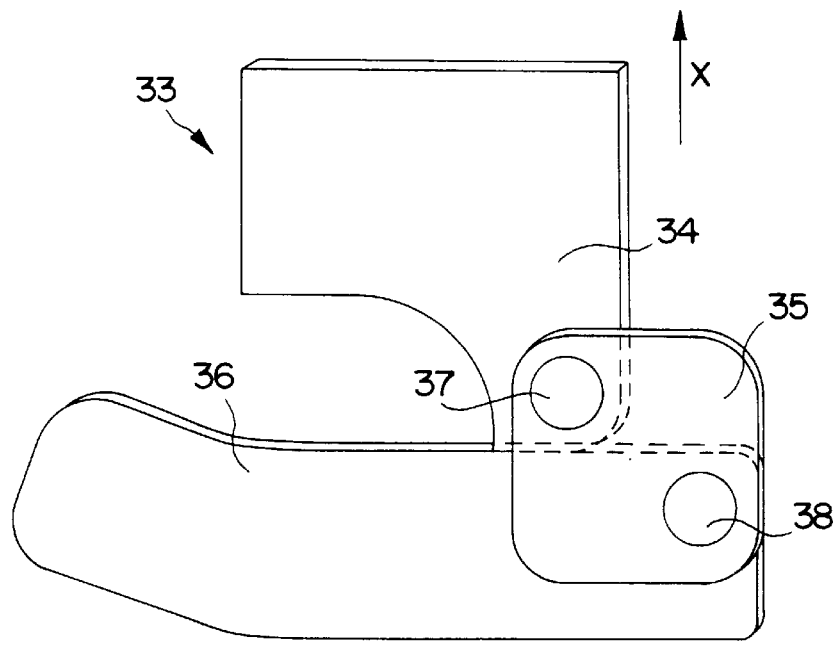
FIG. 3 depicts an alternative form of a molding element formed by an assembly of three blades.

On the basis of the principle described here, the alternative form of FIG. 3 relates to the case of a molding element 33 consisting of an assembly of three parts, each part being made in the form of a flat rigid blade 34, 35, 36 of more or less rectangular geometry. These three blades, arranged in such a way as to have their large faces parallel, are assembled and articulated together about pivoted pins 37 and 38 which are perpendicular to said large faces of the blades.

The blades 34 and 36 are arranged one with respect to the other in such a way as to be in one and the same plane; the third blade 35 is placed on the first two blades in such a way as to act as a connecting piece for said first two parts. The pivot pins 37 and 38 pass through the blades 34, 35 and 35, 36 respectively.

In the molding configuration depicted, the blade 36 butts against the blade 34, so as to mold in the tread an incision which overall has the contour of the blades thus assembled; that part of the incision which is close to the outer area of said strip molded by the blade 34 having a shorter length than that part of the incision which is molded under said area by the blade 36.

As depicted in FIG. 3, in the molding configuration and with the exclusion of the blade 34 which is intended to be fixed to a mold, the other two blades 35 and 36 mold parts of a pattern with an undercut.

Based on the principle of the invention, FIGS. 4 to 9 depict alternative embodiments of molding elements comprising one or more parts which can be rotated under the action of the demolding forces.

Figures 4A, 4B:
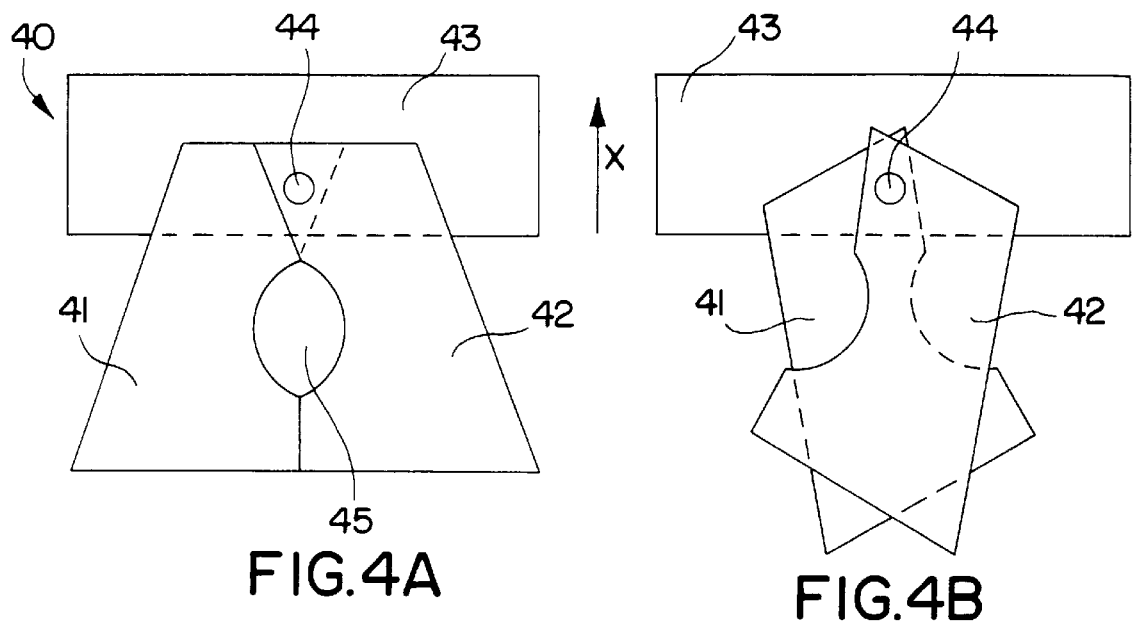
FIG. 4A shows a molding element for molding an incision that has a bridge linking the walls of said incision.
FIG. 4B shows the molding element shown in FIG. 4A in a different position.

The alternative form of molding element 40 depicted in cross-section in FIG. 4 comprises two metal parts 41 and 42 joined about one and the same pivot pin 44 to a third part 43, the latter being intended to be connected to a mold. The two parts 41 and 42 which can rotate are designed such that in the molding position they mold parts of a pattern with an undercut and at the same time define an orifice 45 through which the elastomeric material can pass, during molding, to form a bridge connecting the opposing walls of the molded pattern. The contour of the orifice is designed first of all to force the rotatable parts 41 and 42 to pivot about the pivot pin so that they separate from one another, making good use of the deformable nature of the part molded with an undercut, then once the connecting bridge has been demolded, the two moving parts 41 and 42 can pivot in the opposite direction to make final demolding of the molding element in the direction identified by the arrow X easier.

FIG. 5A shows a perspective view of a molding element 50 in the molding position, having a flat rigid first part 51 in the shape of a T for molding an incision which opens to the area of a tread, said first flat part 51, intended to be fixed to a mold sector by its upper edge 52, on its lower edge 53 has a widening 54 extending on either side of the mid-plane of the first part and along the entire length L of said part.

A second part 55 connected to the lower edge 53 of the first part is intended to mold a channel at the lower end of the incision molded by said first part. This second part 55 consists of four rigid flat parts 56, 57, 58, 59 with the same length L as the first part 51 and joined by their edges so as to be articulated together about pivot pins 62, 63, 64, 65. The end parts 56 and 59 are mounted articulated on either side of the widening 54 of the first part 51 of the molding element about two pivot pins 66, 67. Said widening 54 has bearing areas 60 and 61 interacting with the end pieces 56 and 59 of the second part of the molding element so as to block said second part in the desired molding geometry.

FIG. 5A shows a cross-section through the end of the molding element of FIG. 5A during demolding of said molding element. The second part 55 of the molding element deforms in a manner of a pantograph so as to present an area projected onto a plane perpendicular to the demolding direction X which is smaller than the projected area of the same part in the molding position, this being to make demolding easier.

FIG. 6A shows one embodiment of a blade 70 molding an incision, the cross-section of which forms a Y formed of a middle part 77 intended to be connected to a mold and of two parts 71 and 72 each forming one branch of the Y. The parts 71 and 72 consist respectively of rigid parts 73, 74 and 75, 76 mounted articulated together about pivot pins, said branches 71 and 72 being assembled with the middle piece 77 by means of pivot pins 78, 79. At each articulation there is also a limit stop on each part interacting with the part mounted articulated to it and allowing the blade geometry to be blocked in the desired molding configuration under the action of the molding forces from the elastomeric material forming the tread.

FIG. 6B shows the same blade 70 in a folded configuration making demolding easier.

A blade formed by an assembly of several blades of the same type as the one depicted in FIG. 6 may advantageously be formed, each articulated part 74, 76 being extended, for example, by at least two other articulated branches.

FIGS. 7, 8, 9 show alternative forms of molding elements comprising at least two parts articulated together and having at least two stable molding configurations, each molding configuration molding a part of a pattern with an undercut. A stable holding configuration is understood to mean that there is a geometry of equilibrium of the molding element in which, when it is subjected to the molding forces exerted by the rubbery material, said element maintains its geometry.

Depicted in FIGS. 7 and 8 are two other alternative forms of a molding element 80 according to the invention comprising an identical first part 81 extended by a second part molding a part of a pattern with an undercut, said second part being mounted articulated on the first part 81 about a pivot pin 85 and being able to adopt, depending on the user's choice, a first molding configuration or alternatively a second molding configuration different than the first.

FIG. 7A shows the molding element 80 in a first possible molding configuration: the second part 82 molding a part of a pattern with an undercut is more or less perpendicular to one of the faces 84 of the first part 81 and can rotate about the pivot pin 85. In a second possible molding configuration, depicted in FIG. 7B, the second part 82 comes into abutment against a rib 83 provided on the other face of the first part 81 so as to form an angle other than 90° with said face. Such a molding element thus makes it possible, as the user chooses, to mold two distinct geometries as a pattern.

In the molding element of FIG. 8, the second part 82 of the molding element depicted in FIG. 7 has been replaced by a new part 86 allowing the molding of a new geometry of pattern with an undercut (the smaller size at the end of demolding is depicted in dotted line).

Of course, what has just been described applies to any other form of molding element consisting of at least two parts (not necessarily of flat shape) provided that it is possible to assemble said parts mechanically to form the molding element and to allow each part of an element that molds a part of a pattern with an undercut to pivot in order to make demolding easier.

FIG. 9A shows a perspective view of a molding element 90 comprising two parts: a first part 91 is intended to be fixed to a mold and to project from the molding area of said mold and a second part 94 molding a part of a pattern with an undercut assembled with the first part 91 by the pivot pin 96, said second part being formed of two rigid parts 92, 93 articulated together about a pivot 95. This molding element makes it possible to mold an incision of length L and depth H (corresponding to the dimensions of the part 91), said incision being extended at its base by a channel molded by the second part 94 with an undercut. This molding element 90 also has the possibility of molding several different forms of pattern with an undercut. FIG. 9B depicts the same element during demolding.

Other alternative forms of molding element in accordance with the invention are now described with the aid of FIGS. 11 to 14.

Advantageously a molding element is produced in which at least some part intended to mold a part of a pattern with an undercut is elastically deformable under the action of the demolding forces. Elastically deformable is understood to mean that the geometry of the corresponding part of the element can be altered to a greater or lesser extent under the action of forces acting on said part and that it can revert to a geometry close to the initial geometry as soon as the forces are canceled. The deformation of the geometry of such a molding element is in any case far greater than that obtained simply by the extensions and compressions of the material or materials of which said molding element is made.

FIG. 10 shows the cross-section through a molding element 100 in a molding position for molding an incision in a tread, said molding element 100 comprising a first part 101 intended to be fixed to a mold and a second part 102 in line with the first for molding a part of a pattern with an undercut. Fixed, for example by welding, to the metal part constituting the first part 101 of the molding element 100 and having the shape of a rigid thin plate is the second part 102. This second part 102 consists of a thin metal blade 103 turned back on itself so that in cross-section it forms a loop 104 almost closed on itself. The thin blade may also be made of a material based on silicone polymer or any other material which has appropriate properties.

Figure 10A:
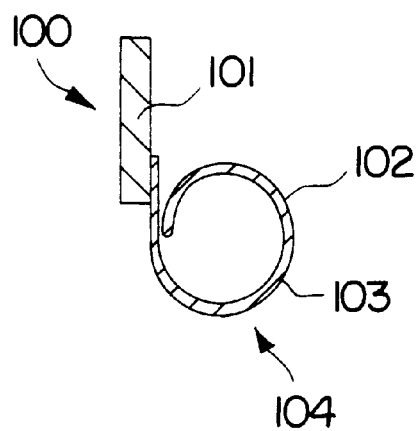
FIG. 10A shows a molding element comprising, at its lower end, a part which is elastically deformable under the action of the demolding forces.
Figure 10B:
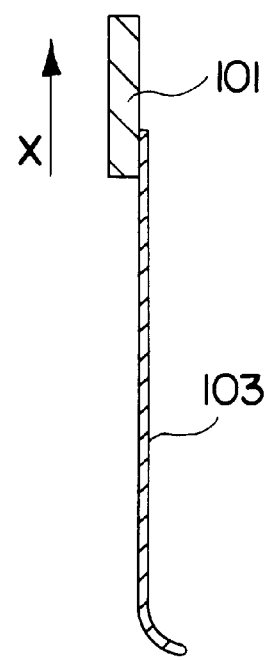
FIG. 10B is a view of the molding element of FIG. 10A in a different position.

FIG. 10A shows the molding element 100 in its shape during the molding of the pattern, while FIG. 10B shows the same element subjected to the demolding forces. The elastomeric material surrounding the part 102 of the element forming the loop forces said part 102 to unroll and pass through the part of the pattern molded by the first part 100 of the molding element. After complete demolding, and due to the return elasticity of the thin blade, the latter naturally reverts to its bent shape ready to be used for another molding operation.

Advantageously, at least one orifice may be made in the elastic thin blade to allow material molded during molding to pass so that it fills the internal cavity formed by the loop. During demolding of the molding element the blade cuts through the bridges of rubber formed at each orifice and an incision which is extended by a channel full of rubber is obtained; this channel becomes a groove at the running area after the tread has become partially worn.

Figure 11A:
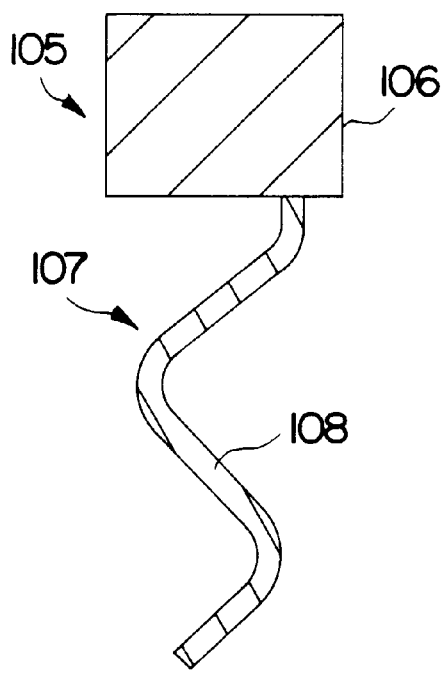
FIG. 11A shows an element for molding a groove which is extended toward the inside of the mold by an incision with a wavy shape.
Figure 11B:
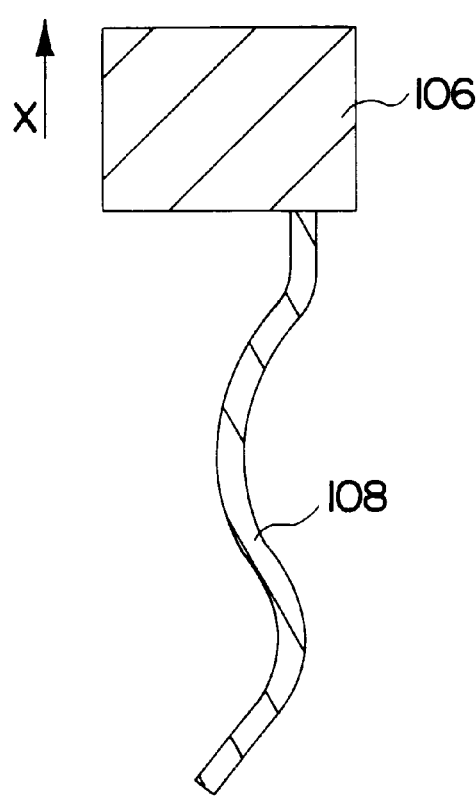
FIG. 11B is a view of the element of FIG. 11A in its demolding position.
Figure 14A:
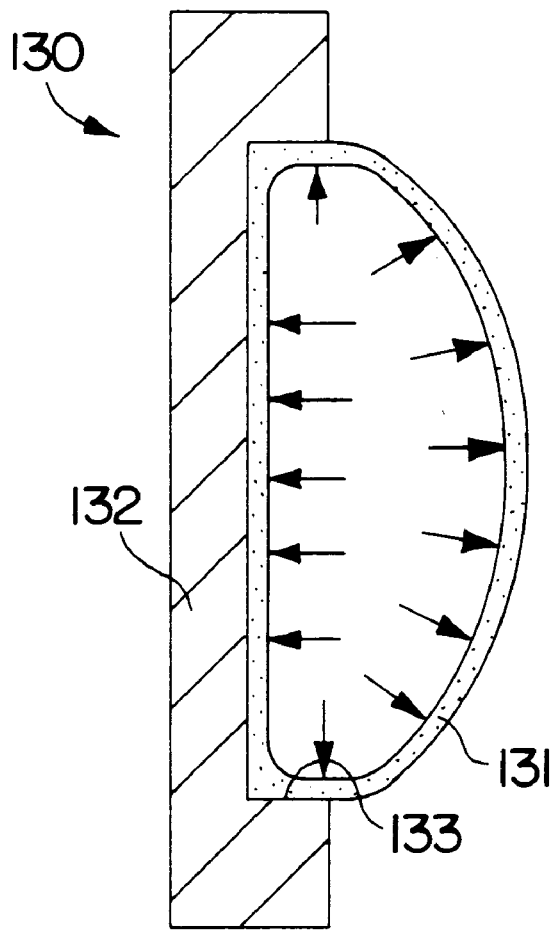
FIG. 14A shows a rigid blade with which there is associated a tube which can deform under the action of a filling fluid.
Figure 14B:
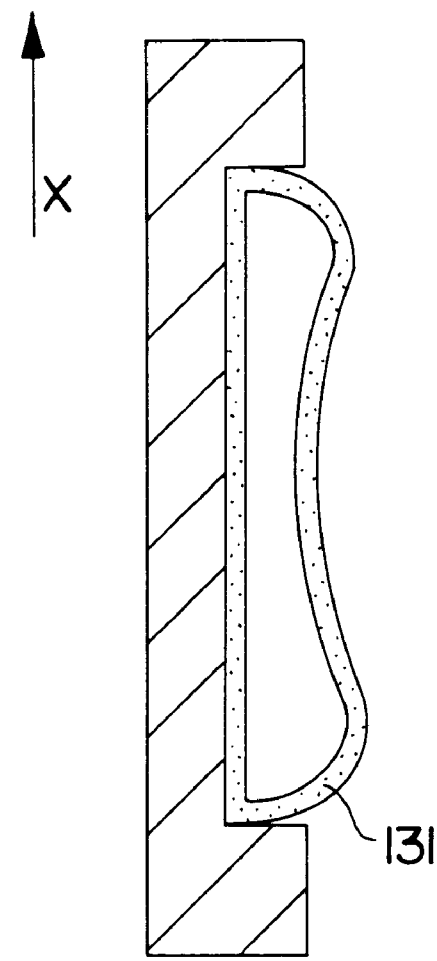
FIG. 14B shows the molding element of FIG. 14A in a different condition.

FIG. 11A shows, in the molding configuration, a molding element 105 comprising a first part 106 for molding a groove on the surface of a tread, said first part 106 being extended by a second part 107 produced in the form of an elastically deformable blade 108, and the cross-section of which has several waves so as to mold an incision which opens into the bottom of the groove, said incision having a very narrow width compared with the width of the groove. FIG. 11B shows the same molding element 105 during demolding: under the action of the forces exerted by the elastomer material, the blade 108 is deformed so that the waves of its cross-section are of an amplitude which is very much smaller than the amplitude of the waves during molding.

FIG. 12 shows, seen in cross-section, another particularly advantageous alternative form of a molding element 110 having the feature that the part of the element that molds the part of the pattern with an undercut is deformable in such a way that, during demolding, the area of said part that bears against the molded material is reduced under the action of the elastomeric material surrounding said molding element. A first rigid part 111 along one of its edges comprises a thinned part 112 extended by a second part 113 which is appreciably wider than the average thickness of the first part 111.

A second part 114 produced, for example, of a silicone polymer, is molded so that it forms a bead 115 which, when unstressed, has a more or less circular cross section; this bead 115 is fixed permanently to the first part 111 of the molding element, coating the entire thinned part 112 and the widened part 113 (holes may be made in the thinned part to improve the anchorage of the second part on the first). The shapes adopted for the thinned part 112 and for the widened part 113 cooperate with the bead 115 to give the molding element good resistance against said bead 115 being torn out during demolding.

The bead 115, intended to mold a part of a pattern with an undercut forming a channel on each side of the end of an incision, is solid and made of an elastically deformable material. FIG. 12A shows the cross-section of such an element in the molding position, while FIG. 12B shows the same molding element during demolding.

Another advantageous alternative form consists in taking an element which, at a lower end of a first rigid part, has a second part, connected to the first permanently and forming a tube, as is shown in FIG. 13 which depicts a cross-section of such an element.

To produce the blade depicted in FIG. 13A, use is made of a blade 121 similar to the blade 111 shown in FIG. 12, in which the deformable end part is replaced by a deformable part forming a tube 122, for example made of silicone elastomer which is chosen for its qualities of good ability to withstand high temperature and good mechanical integrity in the face of repeated molding operations.

FIG. 13B is a cross-section through the molding element 120 in a molding configuration, the tube 122 closes up on itself so as to mold a channel at the end of an incision; during demolding (FIG. 13C) and under the action of the neighboring elastomeric material, the cross-section of the tube changes and becomes more or less oval. Thus the projection of the tube molding the part of the pattern with the undercut onto a plane perpendicular to the demolding direction X occupies a smaller area when compared with the same projection of the same tube in the molding position.

Advantageously, it is possible to insert into the tube, before molding a pattern in a tread, a material, the modulus of elasticity of which is at most equal to 50% of the modulus of the material of which the tube is made so as to prevent the tube from closing up on itself and best optimize the desired shape for molding without in any way preventing the ovalization of said tube during demolding.

Advantageously, a device for conveying filler fluid, possibly under pressure, to fill the tube just described may be provided. In this way, it is possible to obtain another molding configuration of the molding element (see FIG. 13A). Furthermore, means of draining the fluid may be provided for partially or completely driving the filler fluid out to allow the tube to empty and thus make demolding easier. In general, such means should not be absolutely essential bearing in mind the fact that during demolding the material surrounding the tube exerts forces on said tube forcing the fluid to leave said tube.

An alternative form of the molding element 130 comprising a part forming a tube that can be deformed under the action of a pressurized fluid is depicted in FIG. 14. In this alternative form, that part of the element that molds the part of the pattern with the undercut forms an elongate tube 131 fixed, for example by bonding, to one of the faces of a rigid blade 132 (which is not necessarily flat). A recessed housing 133 is provided in the first part of the molding element to accommodate the tube 131 at least partially during the demolding operation.

Means, not depicted here, are provided for conveying a filler fluid as far as the tube so that it can be filled and possibly pressurized during molding. Furthermore, provision may be made for the filler fluid to supply heat to polymerize the elastomeric material of which the tread is made.

In the molding configuration (FIG. 14A), the tube 131 is filled with a fluid (gas or liquid) for molding a part of a pattern with an undercut; note that the filling of the tube may take place prior to or during molding (that is to say when the rubber has already surrounded the molding element). To demold the molding element, the tube is emptied and may revert to its initial shape (see FIG. 14B).

The tube 131 may advantageously be made of silicone polymer.

To obtain good performance over time, it is sensible to reinforce the tube using a reinforcing material such as, for example, a mat based on glass fibers or with metal or textile filaments/cords. This arrangement additionally has the advantage of giving stability over time to the geometry adopted by the tube under the action of the pressure forces of the filling fluid: patterns, the geometries of which are similar and repeatable, arc thus molded.

It is of course possible to combine into one and the same molding element various of the characteristics described above, for example by combining parts of molding element which are mounted articulated and deformable parts such as tubes.

For example, the molding element depicted in FIG. 5 may also comprise a tube, which can be filled with an appropriate fluid, said tube occupying the space delimited by the parts 56, 57, 58, 59 so as to stabilize the geometry of the molding element and/or supply heat for vulcanizing the material of which the tread strip is made during molding.

The invention also relates to a mold for molding a tread, said mold being formed of several parts, at least one part comprising at least one molding element projecting from the molding area of said mold part for molding a pattern in the strip, said molding element being one wherein, at least part of said molding element is mounted on the mold part to pivot about a pivot pin parallel to the molding area in the molding position to allow said part of the molding element to rotate during the wherein said molding element has at least one demolding configuration.

A mold part according to the invention may comprise, on its molding 20 area, appropriate fixing means for fixing in an articulated way, that is to say to allow rotational movement, blades all inclined by the same angle different than 90° with the molding area of said mold. This arrangement makes demolding of the mold element easier, in a demolding direction which is not the direction of the blades, because it is possible for said blades to change orientation relative to the mold during this demolding phase.

We claim:

1. A mold for molding a tread band of a tire, the tread band being made of elastomeric compound, the mold including a molding element anchored in a face of the mold and projecting from said face into said compound for molding a non-demoldable pattern and comprising a groove molding part projecting from the mold face into said compound and at least one undercut molding part laterally extending from the groove molding part in the molding position and which undercut molding part is embedded in the compound in the molding position for molding an undercut in the pattern, said molding element having a demolding direction to withdraw it from the molding position embedded within the molded compound during a demolding operation, said at least one undercut molding part of the molding element moving from the molding position to a demolding position, such that when moved from the molding position for molding an undercut during at least part of the demolding operation the projected area of each part molding a pattern with an undercut onto a plane perpendicular to the the molding direction is smaller than the area of the same part projected onto the same plane in the molding position, so as to make demolding of said molding element easier.

2. A mold having a molding element as claimed in claim 1 in which the groove and undercut molding parts are joined together by at least one pivot pin, said at least one pivot pin allowing the undercut molding part to rotate with respect to the groove molding part under the action of forces acting on the molding element by the molded compound during the demolding operation to allow a reduction of the area projected onto said plane perpendicular to the demolding direction of each part molding an undercut.

3. A mold having a molding element as claimed in claim 1, wherein said molding element comprises at least two molding configurations, each said configuration molding a pattern which has an undercut, it being possible for either one of said configurations to be chosen before said pattern is molded.

4. A mold having a molding element as claimed in claim 1, wherein at least part of said element molding an undercut in a pattern is elastically deformable under the action of the forces acting thereon by the molded compound during the demolding operation.

5. A mold having a molding element as claimed in claim 4, wherein the part molding an undercut is an elastic blade bent on itself so that, viewed in cross-section, it forms a loop.

6. A mold having a molding element as claimed in claim 4, wherein the part molding an undercut has the shape of a tube.

7. A mold having a molding element as claimed in claim 6, wherein the tube is adapted to be filled with a different material than the material forming said tube, said filling material having an elastic modulus at most equal to 50% of the modulus of the material forming the tube.

8. A mold having a molding element as claimed in claim 6, wherein the tube is adapted to be connected to a device for conveying a pressurized filling fluid to the tube and for draining the fluid out of the tube by the pressure forces exerted by the molded elastomeric compound.

9. A mold having a molding element as claimed in claim 6, wherein the tube molding an undercut is reinforced with a reinforcing material to limit the deformation resulting from the lengthening of the material forming the tube.

10. A part of a mold which has a tread molding area for molding a part of a tread, said mold part comprising at least one molding element projecting from the tread molding area of the mold into an elastomeric compound within the mold and in direct contact with said tread molding area and said molding element for molding a pattern in the tread, at least one undercut molding part of said molding element being mounted to pivot in one direction about a pivot pin parallel to the molding area to a molding position embedded within the elastomeric compound to mold an undercut spaced apart from said tread molding area and to allow said part of the molding element to rotate in the opposite direction during removal of the molding element from the elastomeric compound after molding.

11. A mold for molding a tread band of a tire, the tread band being molded of elastomeric compound, the mold comprising a mold surface for molding the tread and a molding element projecting from the mold surface so as to become embedded in the compound to be molded, said molding element including a groove molding part projecting from the mold surface for molding a groove in the tread and at least one undercut molding part supported from the groove molding part at a distance from the molding surface and laterally offset in molding position from said groove molding part for molding a lateral undercut in the tread band extending from the groove beneath the outer surface of the tread, said molding element having a demolding direction to withdraw it from the molding position embedded within the molded compound during a demolding operation, said undercut molding part being displaced from its molding position during demolding so as to reduce the lateral offset of said undercut molding part so as to exit from the molded compound through a groove molded by the groove molding part of the molding element.

12. A mold for molding a tread band of a tire, the tread band being molded of elastomeric compound, the mold comprising a mold surface for molding the tread and a molding element projecting from the mold surface so as to become embedded in the compound to be molded, said molding element including a groove molding part projecting from the mold surface for molding a groove in the tread and a part spaced apart from the molding surface and connected to and laterally offset in molding position from said groove molding part for molding a lateral undercut in the tread, said molding element having a demolding direction to withdraw it from molding position embedded within the molded compound during a demolding operation, said laterally offset part being displaced from its molding position during demolding so as to exit from the molded compound through the groove made by the groove molding part of the molding element.

* * * * *

UNITED STATES PATENT AND TRADEMARK OFFICE
CERTIFICATE OF CORRECTION

PATENT NO. : 6,193,492 B1
DATED : February 27, 2001
INVENTOR(S) : Lagnier et al.

Page 1 of 1

It is certified that error appears in the above-identified patent and that said Letters Patent is hereby corrected as shown below:

<u>Column 5,</u>
Line 28, "and length L1 and L2," should be deleted
Line 39, "3C" should read -- 2C --

<u>Column 11,</u>
Line 20, "the" (second occurrence) should be deleted

Signed and Sealed this

Nineteenth Day of March, 2002

Attest:

JAMES E. ROGAN
*Director of the United States Patent and Trademark Office*

*Attesting Officer*